United States Patent
Li et al.

(10) Patent No.: US 11,868,710 B2
(45) Date of Patent: Jan. 9, 2024

(54) METHOD AND APPARATUS FOR DISPLAYING A TEXT STRING COPIED FROM A FIRST APPLICATION IN A SECOND APPLICATION

(71) Applicant: Honor Device Co., Ltd., Shenzhen (CN)

(72) Inventors: Chundong Li, Nanjing (CN); Ronggen Li, Nanjing (CN); Wei Zhao, Nanjing (CN); Lijun Dong, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 419 days.

(21) Appl. No.: 17/099,680

(22) Filed: Nov. 16, 2020

(65) Prior Publication Data

US 2021/0073463 A1    Mar. 11, 2021

Related U.S. Application Data

(63) Continuation of application No. 16/097,263, filed on Oct. 28, 2018, now Pat. No. 10,853,564, which is a
(Continued)

(51) Int. Cl.
*G06F 40/174*    (2020.01)
*G06F 16/332*    (2019.01)
(Continued)

(52) U.S. Cl.
CPC ........ *G06F 40/174* (2020.01); *G06F 16/3329* (2019.01); *G06F 16/3334* (2019.01);
(Continued)

(58) Field of Classification Search
None
See application file for complete search history.

(56) References Cited

U.S. PATENT DOCUMENTS 7,739,273 B2  6/2010  Brodie et al.
8,745,581 B2  6/2014  Esbensen et al.
(Continued)

FOREIGN PATENT DOCUMENTS

CN    1441357 A    9/2003
CN    101454749 A    6/2009
(Continued)

OTHER PUBLICATIONS

Rhodes et al., "Just-in-time information retrieval agents" IBM Systems Journal, vol. 39, Nos. 3&4, 2000, © 2000 IBM, pp. 685-704. (Year: 2000).*

(Continued)

*Primary Examiner* — Amelia L Tapp
(74) *Attorney, Agent, or Firm* — Conley Rose, P.C.

(57) ABSTRACT

A method is applied to an electronic device, and includes: obtaining content copied by a user on a first page, and determining a category to which the content belongs; obtaining a category of a second page; matching the category of the content against the category of the second page; and if a matching result is not empty, displaying at least one operation option on the second page, where the at least one operation option has a function of performing an operation for the content on the second page, so that the electronic device directly performs the function after the user selects the operation option.

36 Claims, 6 Drawing Sheets

Related U.S. Application Data continuation of application No. PCT/CN2016/080438, filed on Apr. 28, 2016.

(51) Int. Cl.
  *G06F 40/30* (2020.01)
  *G06F 40/166* (2020.01)
  *G06F 16/33* (2019.01)
  *G06F 16/35* (2019.01)

(52) U.S. Cl.
  CPC ............ *G06F 16/35* (2019.01); *G06F 40/166* (2020.01); *G06F 40/30* (2020.01)

(56) References Cited

U.S. PATENT DOCUMENTS

| | | | |
|---|---|---|---|
| 8,832,543 | B2 | 9/2014 | Broman et al. |
| 9,904,461 | B1 | 2/2018 | Martynov et al. |
| 10,013,152 | B2 | 7/2018 | Nordstrom |
| 2003/0154207 | A1 | 8/2003 | Naito |
| 2004/0230572 | A1 | 11/2004 | Omoigui |
| 2007/0035745 | A1 | 2/2007 | Izumi et al. |
| 2010/0138775 | A1 | 6/2010 | Kohen et al. |
| 2012/0210213 | A1 | 8/2012 | Watanabe et al. |
| 2012/0254797 | A1 | 10/2012 | Nagahama et al. |
| 2013/0212470 | A1 | 8/2013 | Karunamuni et al. |
| 2013/0325343 | A1* | 12/2013 | Blumenberg ...... G01C 21/3881 701/533 |
| 2014/0304634 | A1 | 10/2014 | Kumazawa et al. |
| 2014/0324808 | A1 | 10/2014 | Sandhu et al. |
| 2014/0331127 | A1 | 11/2014 | Chang et al. |
| 2015/0153921 | A1 | 6/2015 | Dou et al. |
| 2015/0331644 | A1 | 11/2015 | Nagarajan |
| 2016/0285928 | A1 | 9/2016 | Sanso et al. |
| 2017/0235618 | A1* | 8/2017 | Lin .................. G06F 9/546 719/313 |

FOREIGN PATENT DOCUMENTS

| | | |
|---|---|---|
| CN | 101996165 A | 3/2011 |
| CN | 102609208 A | 7/2012 |
| CN | 102866988 A | 1/2013 |
| CN | 102929926 A | 2/2013 |
| CN | 103064584 A | 4/2013 |
| CN | 103324274 A | 9/2013 |
| CN | 104090978 A | 10/2014 |
| CN | 104166646 A | 11/2014 |
| CN | 104246678 A | 12/2014 |
| CN | 106776082 A | 5/2017 |
| EP | 1172751 A1 | 1/2002 |
| JP | H11306177 A | 11/1999 |
| JP | 2000339401 A | 12/2000 |
| JP | 2003241879 A | 8/2003 |
| JP | 2004126769 A | 4/2004 |
| JP | 2005031979 A | 2/2005 |
| JP | 2005141161 A | 6/2005 |
| JP | 2008186217 A | 8/2008 |
| JP | 2009524893 A | 7/2009 |
| JP | 2014134950 A | 7/2014 |
| JP | 2014203404 A | 10/2014 |
| WO | 2013000123 A1 | 1/2013 |

OTHER PUBLICATIONS

Stylos, J., "Citrine: Providing Intelligent Copy-and-Paste" UIST '04, vol. 6, Issue 2, Copyright 2004 ACM, 2004, pp. 185-188.

Reichl, D., "Features-KeePass", XP055817884, Jan. 9, 2007, 5 pages.

Kerr, R., et al., "Context-Sensitive Cut, Copy, and Paste" C3S2E-08, Montreal, Copyright May 12-13, 2008, pp. 159-166.

Zhao, S., et al., "AutoComPaste: Auto-Completing Text as an Alternative to Copy-Paste" AVI '12, Copyright 2012 ACM, 2012, pp. 365-372.

iefans.net, "The-Paste and Go function in IE10 is more convenient to use," Retrieved from the internet:https://www.iefans.net/ie10-zhantie-zhuandao-gongneng-fangbian/, Nov. 3, 2012, 4 pages. With English Abstract.

Stylos, J., et al., "Citrine: Providing Intelligent Copy-and-Paste," Retrieved from the internet: URL:https://www.cs.cmu.edu/~citrine/CitrinePaper.long.pdf, Proceedings of the 17th Annual ACM Symposium on User Interface Software and Technology, Santa Fe, NM, USA, Oct. 24-27, 2004, 10 pages.

Everyone is a product manager "Taobao launched the Taoyou Tao password, let us have a pleasant exchange and shopping," Retrieved from the internet: https://www.sohu.com/a/24291064_114819, Dec. 5, 2022, 12 pages. With English Abstract.

* cited by examiner

# METHOD AND APPARATUS FOR DISPLAYING A TEXT STRING COPIED FROM A FIRST APPLICATION IN A SECOND APPLICATION

CROSS-REFERENCE TO RELATED APPLICATIONS

This application is a continuation of U.S. patent application Ser. No. 16/097,263, filed on Oct. 28, 2018. The U.S. patent application Ser. No. 16/097,263 is a national stage of International Application No. PCT/CN2016/080438, filed on Apr. 28, 2016, which is hereby in cooperated by reference in its entirety.

TECHNICAL FIELD

The present invention relates to the field of mobile communications, and in particular, to a human-computer interaction method and an apparatus thereof.

BACKGROUND

At present, existing smartphones all have basic copy and paste functions. A user performs a copy operation on a panel having content that needs to be copied, to copy the content into a clipboard; and then opens another application or switches to another page, chooses a target area, and long presses the target area to paste the copied content before the user can finally perform a desired further operation.

After the user opens these applications or switches to these pages, an expected to-be-performed action is usually predictable. However, the user needs to always perform a plurality of repeated operations to complete the expected action. For example, the user copies "Nanjing South railway station" to the clipboard, and opens a map application to enter a map page, and the user needs to choose an address input box first, and long press the address input box for pasting before the user can further tap a search option to view desired information. This undoubtedly burdens the user with some unnecessary trivial operations.

In the prior art, using locating on an electronic map as an example, an entire copy-paste procedure includes the following steps: selecting desired to-be-copied text; then tapping the text and copying the text; opening an application software page; choosing an input box, and long pressing the input box for pasting; and pasting the text into the input box of the electronic map to perform searching and locating.

Disadvantages of the foregoing paste manner in the prior art are as follows: First, the user needs to additionally tap the input box (a target area), long press the input box, wait until a paste option is displayed, and tap the paste option for pasting before the user can finally search for target information. Second, the user probably needs to perform tapping a plurality of times to choose the input box; unintentional sliding may occur during long pressing after the input box is chosen, and the user needs to long press the input box again. Moreover, the user is likely to forget the copied content and needs to perform a plurality of operations before the user can confirm the copied content.

SUMMARY

To overcome disadvantages in the prior art, the present invention provides a human-computer interaction method and an apparatus thereof. The method can reduce complexity of user operations.

A first aspect of the present invention provides a human-computer interaction method, applied to an electronic device. The method includes: obtaining content copied by a user on a first page, and determining a category to which the content belongs; obtaining a category of a second page; matching the category of the content against the category of the second page; and if a matching result is not empty, displaying at least one operation option on the second page, where the at least one operation option has a function of performing an operation for the content on the second page, so that the electronic device directly performs the function after the user selects the operation option.

In a first possible implementation of the first aspect, the determining a category to which the content belongs includes: performing semantic analysis on the copied text content to extract a keyword of the copied content, and matching the keyword against a keyword category library to obtain the category to which the content belongs.

With reference to the first possible implementation of the first aspect, in a second possible implementation, the copied text content includes one or more keywords, and there are one or more categories of the keyword.

In a third possible implementation of the first aspect, there is one or more categories of the second page.

With reference to the third possible implementation of the first aspect, in a fourth possible implementation, one or more categories to which the content belongs are separately matched against one or more categories of the second page.

In a fifth possible implementation of the first aspect, before the step of obtaining a category of a second page, the method further includes: determining that a time interval between the copy operation of the user and opening of the second page is within a preset time limit range.

With reference to the first, second, third, fourth, or fifth possible implementation of the first aspect, in a sixth possible implementation, the copied content is text information, the copied text content is text information rather than image, sound or video data, and common text document name extensions include .txt, .doc, .docx, .wps, and the like.

In a seventh possible implementation of the first aspect, the category of the second page is predefined, and categorization of the second page is consistent with categorization of the keyword, so that it is more convenient to match the category of the second page against the category of the keyword.

A second aspect of the present invention provides a human-computer interaction apparatus. The apparatus includes: a module for obtaining a category of content copied by a user, a second page category obtaining module, a matching module, and a prompt operation module, where the module for obtaining a category of content copied by a user is configured to: obtain content copied by a user on a first page, and determine a category to which the content belongs; the second page category obtaining module is configured to obtain a category of a second page; the matching module is configured to match the category of the content against the category of the second page; and the prompt operation module is configured to: if a matching result is not empty, display at least one operation option on the second page, where the at least one operation option has a function of performing an operation for the content on the second page, and the function is directly performed after the user selects the operation option.

In a first possible implementation of the second aspect, the module for obtaining a category of content copied by a user is configured to: perform semantic analysis on the text content copied by the user to obtain a keyword of the copied text content, and match the keyword against a keyword category library to extract a category of the keyword.

In a second possible implementation of the second aspect, the matching module is configured to separately match one or more categories of the keyword against one or more categories of the second page, to obtain one or more matched combinations of the keyword and the second page.

The apparatus includes a mobile phone, a tablet computer, a palmtop computer, and a personal digital assistant (Personal Digital Assistant, PDA).

In embodiments of the present invention, a category of copied text content that is extracted is matched against a category of a keyword, and a matched group is used as a prompt operation. The prompt operation is displayed in a form of a dialog box, to prompt a next action that may be performed by a user, so that complexity of user operations is reduced, and accuracy of pasting text information is improved.

DESCRIPTION OF EMBODIMENTS

The following further describes the technical solutions of the present invention in detail with reference to the accompanying drawings and embodiments.

In the embodiments of the present invention, when a user copies text, a keyword in copied text content is categorized. When the user enters an application software page, a category of the application software page is obtained, and is matched against a category of the keyword. Finally, a matched category is used as a prompted operation option, and the prompted operation option is displayed in a form of a dialog box. The user performs a tap operation on the prompted operation option. Therefore, problems of complex operations, low accuracy, and trivial operations in a copy-paste method in the prior art are resolved.

The method in the embodiments of the present invention is applied to system software (the system software is a system supporting development and running of application software, and is a set of various programs that do not need to be intervened with by a user) of a terminal. The terminal includes pieces of application software (the application software is a set of application programs that are compiled by using various programming languages, and is a computer software program designed to resolve various application problems, such as a navigation app or Word).

The terminal may include a processor, a memory, an input module, a display module, a network communications module, and a system bus. The system bus is configured to perform information transfer between components of the terminal. The input module may include one or more of components such as a keyboard, a touchscreen, and a mouse, and is configured to receive information entered by a user and send the received information to the processor for processing. The display module is configured to display content that the terminal needs to display. The input module and the display module may be integrated in one touchscreen. The network communications module is configured to implement a function of communication between the terminal and an external device. The memory may include one or more computer readable storage media, and may store corresponding programs such as an operating system and application software. For example, if a navigation app is installed on the terminal, application software used to install the navigation app is stored in the memory of the mobile phone terminal. The processor runs software programs and modules stored in the memory to perform various functional applications of the terminal and perform data processing.

Figure 1:
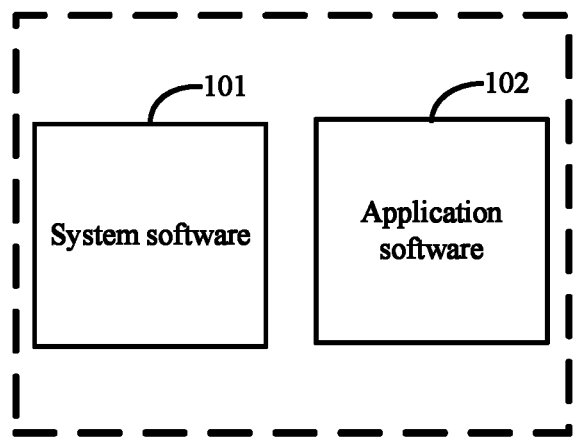
FIG. 1 is a block diagram of smart paste according to an embodiment of the present invention.

The following uses FIG. 1 as an example for description. FIG. 1 is a block diagram of smart paste according to an embodiment of the present invention, and the block diagram includes system software 101 and application software 102. In this embodiment of the present invention, the system software 101 is developed based on an operating system of a terminal, and the application software 102 on the terminal is developed based on the system software 101. After a user copies text, a category of a keyword COPYKEY in copied text content is matched against a category of a page of the application software 102. Because one piece of application software 102 includes a plurality of application software pages, and a page category ACTIVITYTYPE is preset in an attribute of an application software page. In other words, a category attribute TYPE is added in an application software page ACTIVITY. Therefore, when the system software 101 runs, the category ACTIVITYTYPE of the page of the application software 102 may be directly read and matched against a category COPYTYPE of the keyword. Finally, a matched category is used as an operation option and the operable operation is displayed in a dialog box, to complete an entire copy-paste process. The paste described herein is not an operation of pasting text that is temporarily stored in a clipboard in the prior art, but instead, is a process in which the system software 101 displays, in a dialog box, the matched category for the user to select.

It should be noted that in implementation of the present invention, the terminal may be a terminal device that has a function of installing application software, such as a mobile phone, a tablet computer, a palmtop computer, or a personal digital assistant (Personal Digital Assistant, PDA). This is not limited.

The present invention provides a human-computer interaction method, applied to an electronic device, and including:

obtaining content copied by a user on a first page, and determining a category to which the content belongs;
obtaining a category of a second page;
matching the category of the content against the category of the second page; and if a matching result is not empty, displaying at least one operation option on the second page, where the at least one operation option has a function of performing an operation for the content on the second page, so that the electronic device directly performs the function after the user selects the operation option.

Figure 2:
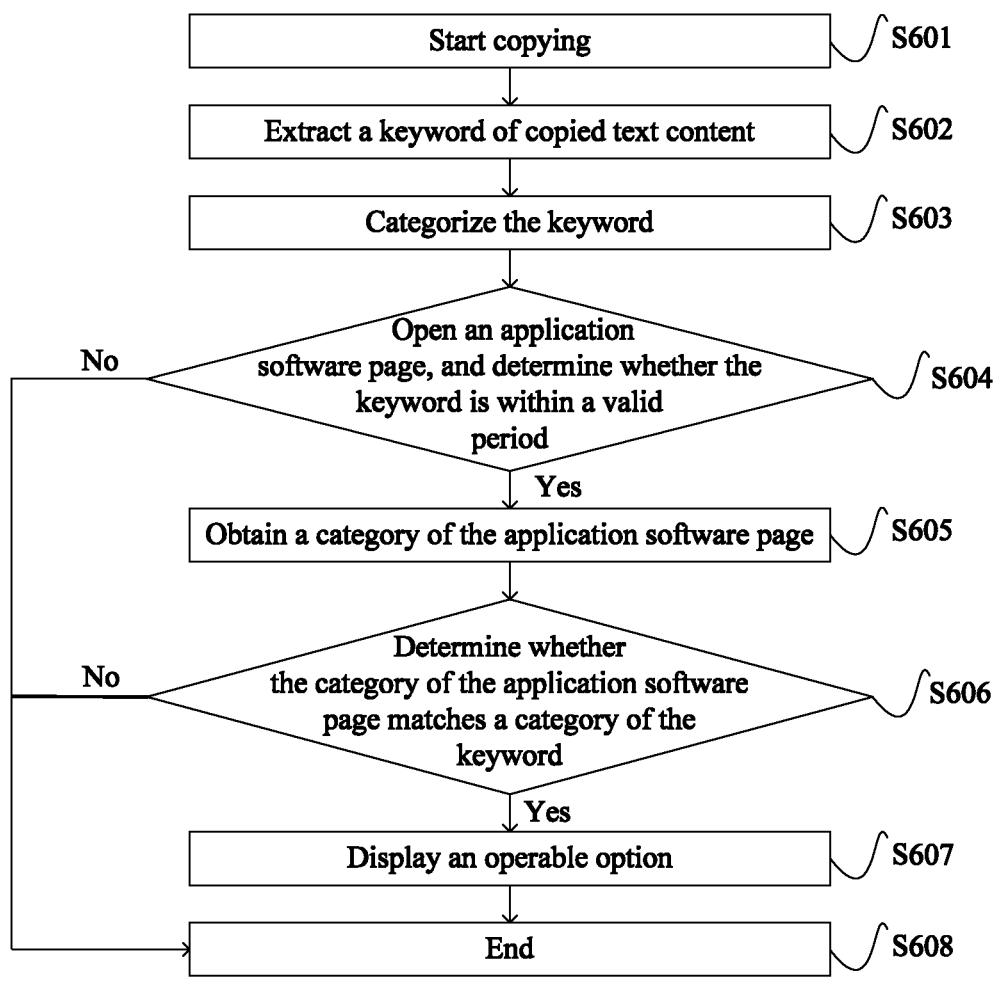
FIG. 2 is a schematic flowchart of a smart paste method according to an embodiment of the present invention.

This embodiment of the present invention is based on an Android operating system. The first page and the second page are both application software pages. The first page and the second page may be a same application software page or may be different application software pages. The following uses an electronic map app as an example for description. FIG. 2 is a schematic flowchart of a smart paste method according to an embodiment of the present invention. As shown in FIG. 2, the method includes steps S601 to S608.

Step S601: Start copying.

A user chooses to copy text on an application software page of a terminal, where copied text content is temporarily stored in a clipboard.

It should be noted that one piece of application software in the terminal may include one or more application software pages. For example, in an electronic map, there is an application software page for locating, an application software page for navigation, and further an application software page for viewing real-time traffic, which are collectively referred to as application software pages in this embodiment of the present invention. The application software includes an electronic map app, an electronic address book app, a browser app, and the like, which are not listed one by one herein.

In this embodiment of the present invention, the copied text is a document type in a computer, and is mainly used to record and store text information rather than image, sound or video data. Common text document name extensions include .txt, .doc, .docx, .wps, and the like, which are not limited and are collectively referred to as text.

Step S602: Extract a keyword of copied text content.

Figure 2A:
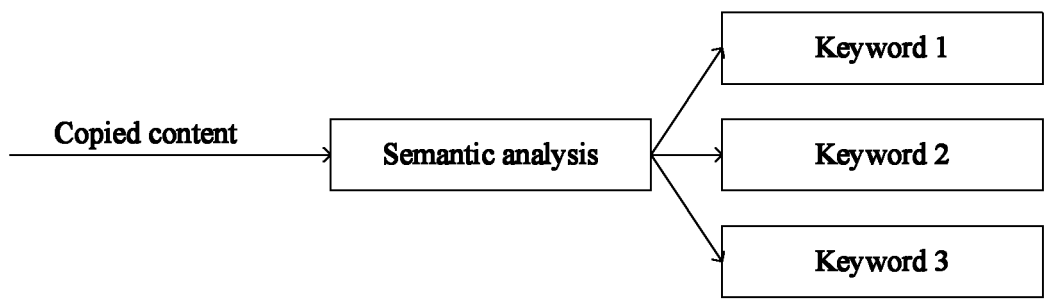
FIG. 2a is a schematic flowchart of extracting a keyword according to an embodiment of the present invention.

As shown in FIG. 2a, FIG. 2a is a schematic flowchart of extracting a keyword according to an embodiment of the present invention. After semantic analysis is performed on the text content copied by the user, N (N is an integer greater than or equal to 1) keywords are extracted from the copied content.

For example, a keyword "Nanjing South railway station" is extracted from copied text content "Passengers can take Nanjing Metro Line 1 to Nanjing South railway station". A plurality of keywords may be extracted from the copied text content, and keyword indexes are established. The extracted keyword is shown in Table 1. Table 1 is a schematic diagram obtained after a keyword is extracted according to an embodiment of the present invention.

TABLE 1

| Index | Keyword |
|---|---|
| 1 | Nanjing South railway station |

It should be noted that when the user copies the text content, the user may choose to directly copy "Nanjing South railway station", and semantic analysis is then performed on the copied text content "Nanjing South railway station" to obtain the keyword "Nanjing South railway station". To be specific, semantic analysis is performed for purposes of a more convenient and accurate process of obtaining the keyword from the copied text content. For example, when the user performs a copy operation, the keyword "Nanjing South railway station" can be obtained through semantic analysis even if the copied text content is "To Nanjing South railway station".

Step S603: Analyze and categorize the keyword.

Figure 2B:
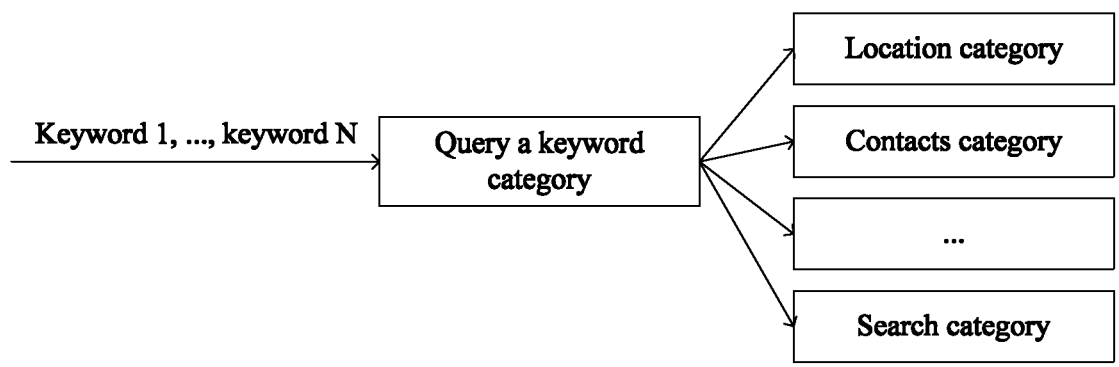
FIG. 2b is a schematic diagram of matching a keyword against a keyword category library according to an embodiment of the present invention.

As shown in FIG. 2b, FIG. 2b is a schematic diagram of matching a keyword against a keyword category library according to an embodiment of the present invention.

The extracted keyword is matched against the keyword category library to determine a category of the keyword.

It should be noted that the keyword category library is stored in a memory of the terminal. A path of the keyword category library is written into a program of system software in this embodiment of the present invention. When the program of the system software runs, a processor directly invokes the keyword category library to match the extracted keyword against the keyword category library. The keyword category library is preset and supports expansion. The keyword category library includes a location category, a contacts category, a search category, a web address category, a text path category, a video resource path category, an audio resource path category, and the like. In each category of the keyword, a plurality of attributes that belong to characteristics of the category are prestored, for example, "Nanjing South railway station", "Beijing West railway station", and the like are stored in the location category.

In this embodiment of the present invention, each keyword may belong to a plurality of categories. For example, a keyword "Nanjing South railway station" belongs to a location category to perform navigation or locating on "Nanjing South railway station", and further belongs to a search category to perform a search on a browser page. After a category of the keyword is determined, as shown in Table 2, Table 2 is a schematic diagram obtained after a keyword is matched against the keyword category library according to an embodiment of the present invention. Table 2 shows one keyword "Nanjing South railway station", and two keyword categories, which are a keyword category 1 "location category" and a keyword category 2 "search category" respectively.

TABLE 2

| Index | Keyword | Keyword category 1 | Keyword category 2 |
|---|---|---|---|
| 1 | Nanjing South railway station | Location category | Search category |

Step S604: Open an application software page, and determine whether the keyword is within a valid period.

The user copies text, and then opens an application software page after a particular time. In other words, there is a period of time between copying of the text and an operation of opening application software. When the user opens the application software, for a keyword temporarily stored in a clipboard, the program of the system software needs to determine whether a time interval between the copying of the text and the operation of opening the application software is within a predetermined time.

If a determining result is that the time interval between the copying of the text and the operation of opening the application software is within the predetermined time or is equal to the predetermined time, step S605 is performed. If a determining result is that the time interval between the copying of the text and the operation of opening the application software exceeds the predetermined time, step S605 is not performed, and therefore step S608 is performed.

In this embodiment of the present invention, the predetermined time is a time set by default by the program of the system software. The user may customize the predetermined time based on a requirement. For example, the time interval between the copy operation and the operation of opening the application software is set to five minutes by using a settings menu bar of a mobile phone terminal. In this case, after the copy operation is completed, a valid period of the copied text is five minutes. If the time interval between the copy operation and the operation of opening the application software exceeds five minutes, the copied text becomes invalid and subsequent steps can no longer be performed, but step S608 is directly performed instead.

It should be noted that compared with the duration of step S603 and step S604, the duration of step S601 to step S603 is negligible. The time interval between the copy operation and the operation of opening the application software described in this embodiment of the present invention is a time between step S603 and step S604. For example, between step S603 and step S604, the user has not opened application software for a long time after copying the text, but instead chooses to power off the terminal. In this case, the copied text becomes invalid.

Step S605: Obtain a category of the application software page.

The application software opens an interface to a system software vendor or a terminal device manufacturer or supports a system architecture such as an Intent architecture of Android to implement that the terminal device obtains and uses a category of an application software page.

Categories of application software pages include a location category, a contacts category, a search category, a web address category, a text path category, a video resource path category, an audio resource path category, and the like.

Application software pages and categories of the application software pages are shown in Table 3. Table 3 is a schematic diagram of application software pages and categories of the application software pages according to an embodiment of the present invention.

TABLE 3

| Application program page | Application program page category |
|---|---|
| Electronic map page | Location category |
| Browser page | Search category |

It should be noted that the categories of the application software pages are consistent with categories in the keyword category library to facilitate matching in step S606. Because a category attribute TYPE is added to an application software page ACTIVITY, the program of the system software reads a category ACTIVITYTYPE of the application software page. However, when a category attribute TYPE is not added to an application software page ACTIVITY, the program of the system software obtains a category of application software and uses the category of the application software as the category of the application software page. The obtaining a category of application software herein is as follows: Application software apps whose user quantities rank on top in markets are categorized in advance to obtain a category table, and the category table is stored on a server or a cloud, and is stored into a memory of a terminal during installation of the application software app on the terminal. Alternatively, a terminal may obtain a category of application software from a server or a cloud when querying the category of the application software. Alternatively, a user may manually add a category to application software. When the user manually adds a category, a system may prompt the user to select and add a category that can be added. Alternatively, a category of application software may be obtained from another terminal, for example, category information of application software is obtained in a manner such as Bluetooth or WLAN. When the program of the system software performs step S605, the category table is directly read from the memory of the terminal, or the category of the application software is obtained from a network side, or information is obtained from another terminal, so as to obtain the category of the application software. For example, even if TYPE is not defined on an application software page for the Baidu Maps app, the AutoNavi map app, the Sogou Maps app, and the like, these apps can be classified into a location category to obtain a category table for storage.

Step S606: Determine whether the category of the application software page matches a category of the keyword.

A category of an application software page, after being obtained, needs to be matched against a category of a keyword extracted from copied text. The matching means searching one or more categories one by one for the keyword extracted from the copied text to determine whether the category of the keyword is consistent with the category of the application software page.

It should be noted that an application software page and a keyword each may belong to more than one category. Therefore, a two-layer cyclic manner needs to be used to perform comparison on each combination.

Figure 2C:
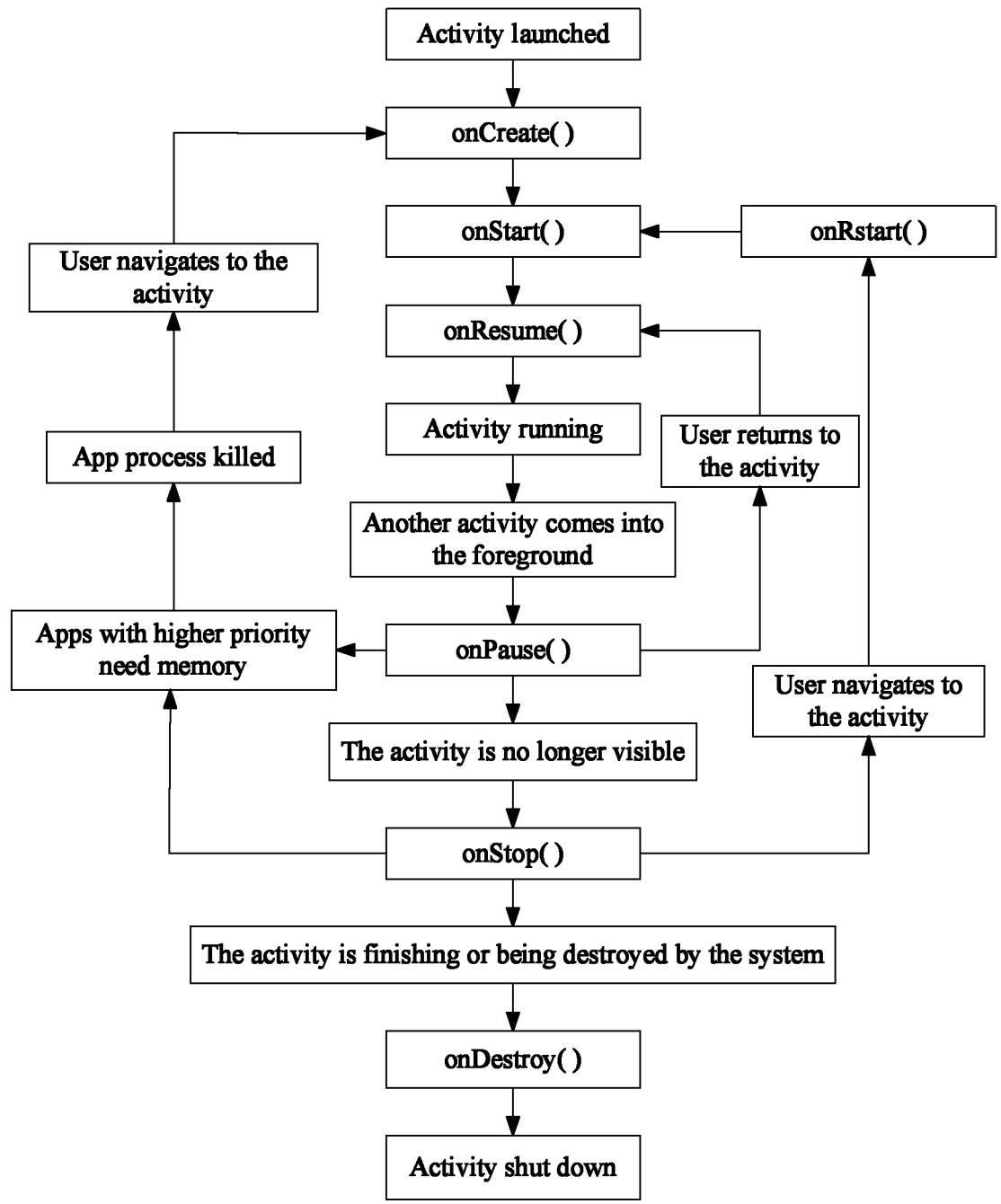
FIG. 2c is a schematic diagram of a lifecycle of each activity maintained by an Android system according to an embodiment of the present invention.

The following uses FIG. 2c as an example to describe a specific embodiment of obtaining a category of an application software page. Specifically, FIG. 2c shows a lifecycle of each activity maintained by an Android system. When an Activity is entered for the first time, an onCreate( ) method of the Activity is performed. Operations of obtaining a category of the Activity and matching the category of the Activity against content in a clipboard may be added to an onCreate( ) method of an Activity.java class.

A category of each Activity is configured in an AndroidManifest.xml file as follows:

```
<activity
    android:name="com.example.smartpaste.MainActivity"
    android:label="@string/app_name" >
    <meta-data
    android:name="sort"
    android:value="search|navigation|location" />
    </intent-filter>
</activity>
```

A category is configured in a form of a key-value (key-value) pair. A plurality of values may be configured in "value", and are separated by "|".

```
Modify Activity.onCreate( ):
protected void onCreate(Bundle savedInstanceState) {
    ...
    String sort[ ] = readCategory( );//Read a category of an Activity
    matchClipboard(sort);//Match a category against a keyword in a clipboard
    ...
}
    private String[ ] readCategory( ) {
        try {
            ActivityInfo activityInfo = this.getPackageManager( ).getActivityInfo(
                getComponentName( ),
PackageManager.GET_META_DATA);
            String value = activityInfo.metaData.getString("sort", null);
            if (!TextUtils.isEmpty(value)) {
                String sort[ ] = value.split("\\|");
                return sort;
            }
        } catch (NameNotFoundException e) {
            e.printStackTrace( );
        }
        return null;
    }
    private void matchClipboard(String[ ] sort) {
        //TODO
    }
```

Callback after an option is tapped:

```
//Callback, a callback after "Search for xxx" is tapped:
public void onSmartPasteForSearch(String value) { }
//Callback, a callback after "Locate xxx" is tapped
public void onSmartPasteForLocation(String loc) { }
Callback, a callback after "Navigate to xxx" is tapped
public void onSmartPasteForNavigation(String loc) { }
```

Figure 2D:
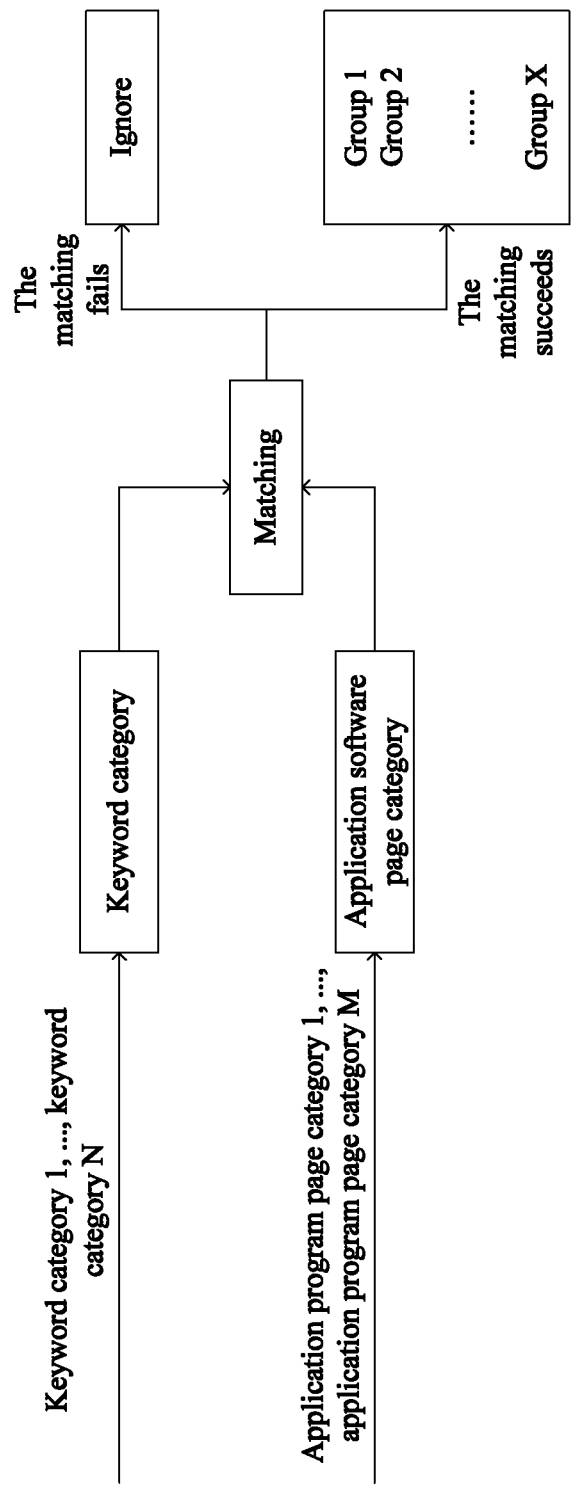
FIG. 2d is a schematic diagram of matching a keyword category against an application software page category according to an embodiment of the present invention.

The following uses FIG. 2d as an example for description. FIG. 2d is a schematic diagram of matching a category of a keyword against a category of an application software page according to an embodiment of the present invention.

As shown in FIG. 2d, a keyword extracted from copied text may belong to a plurality of categories, which are N (N is an integer greater than 0) keyword categories. An application software page may also belong to a plurality of categories, which are M (M is an integer greater than 0) application software page categories. Each category of the keyword needs to be matched against each category of the application software page. If the matching fails, the combination for matching is ignored, and step S608 is performed. If the matching succeeds, all matched combinations are stored, the matched combinations are stored in a buffer allocated by a processor of a terminal to system software in this embodiment of the present invention, and step S607 is performed. There may be a plurality of matched combinations, which are X matched groups (X is a positive integer greater than 0).

Matching results are shown in Table 4. Table 4 is a schematic diagram obtained after categories of a keyword are matched against categories of application software pages according to an embodiment of the present invention.

TABLE 4

| Application program page | Application program page category | Keyword category | Matching result |
|---|---|---|---|
| Electronic map page | Location category | Location category | Matching succeeds |
| Electronic map page | Location category | Search category | Matching fails |
| Browser page | Search category | Search category | Matching succeeds |

Step S607: Display an operable option.

After the category of the application software page matches the category of the keyword, there may be a plurality of X matched groups. In this case, all matched groups are displayed. In other words, a "paste" operation is completed.

Table 5 is a schematic diagram obtained after a keyword matches application software pages according to an embodiment of the present invention.

TABLE 5

| Application program page | Keyword | Keyword category | Prompt operation |
|---|---|---|---|
| Electronic map page | Nanjing South railway station | Location category | Position: Nanjing South railway station |
| Electronic map page | Nanjing South railway station | Location category | Navigate to: Nanjing South railway station |
| Browser page | Nanjing South railway station | Search category | Search: Nanjing South railway station |

As shown in Table 5, categories of a keyword "Nanjing South railway station" include a location category and a search category. An electronic map page belongs to the location category. After the matching succeeds, the matched group is displayed in a form of a dialog box. To be specific, during a prompt operation, "Locate: Nanjing South railway station" and "Navigate to: Nanjing South railway station" are displayed. A browser page belongs to a search category, and after the matching succeeds, the matched group is displayed in a dialog box. To be specific, during a prompt operation, "Search for: Nanjing South railway station" is displayed.

Figure 2E:
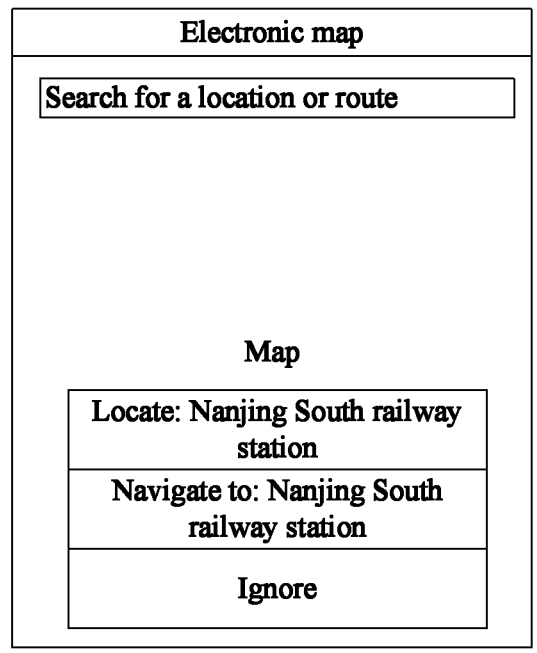
FIG. 2e is a schematic diagram of prompt operations displayed on an electronic map according to an embodiment of the present invention.

This is described below by using an electronic map as an example. FIG. 2e is a schematic diagram of prompt operations displayed on an electronic map of a terminal according to an embodiment of the present invention.

As shown in FIG. 2e, a matched group is displayed on an electronic map. To be specific, a location category of a keyword "Nanjing South railway station" matches a location category of an electronic map page. The electronic map page belongs to a location category, but a category of an electronic map is more accurately classified into "Navigate" and "Locate". Therefore, after a user opens the electronic map page, "Locate: Nanjing South railway station" and "Navigate to: Nanjing South railway station" are displayed. Apparently, it is unlikely herein to display all operations that the user wants to perform. In other words, the user may want to perform an operation other than "Navigate" or "Locate". Therefore, an "Ignore" option is provided in the displayed dialog box for the user to select. The user can directly perform the operation of navigating to or locating Nanjing South railway station by tapping "Navigate" or "Locate".

The following describes the smart paste method in this embodiment of the present invention by using address book application software as an example.

A user copies a piece of text information "Xiao ming's phone number is 12312345678" on a page of application software. A program of system software performs semantic analysis on the copied text information to obtain a keyword "Xiao ming/12312345678". In this case, the program of the system software invokes a keyword category library, to match the keyword against the keyword category library, and it is obtained that the category of the keyword is "contacts category". When the user opens a page of the address book application software, a valid period of the keyword temporarily stored in a clipboard is determined. If a time interval between the copy operation and the page opening operation exceeds the valid period, running of the program of the system software is directly terminated. If the time interval is within the valid period, it is obtained that a category of the page of the address book application software is "contacts category", and the obtained "contacts category" of the keyword is matched against the category of the page of the address book application software, to obtain a matching result "Contacts category matching succeeds".

Figure 3:
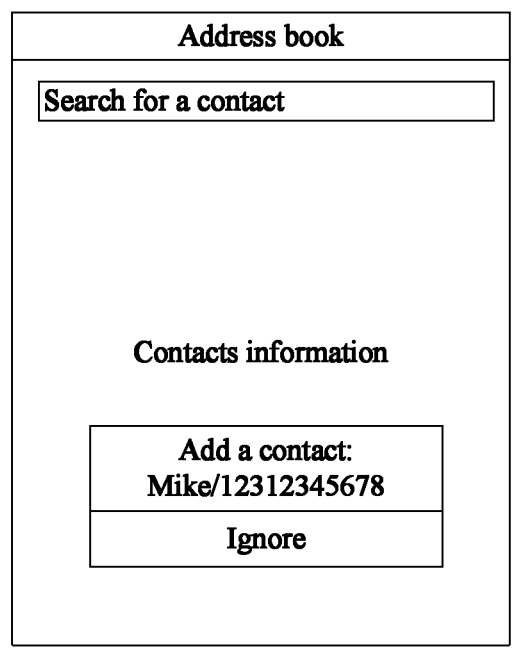
FIG. 3 is a schematic diagram of a prompt operation displayed in an address book according to an embodiment of the present invention.

As shown in FIG. 3, FIG. 3 is a schematic diagram of a prompt operation displayed on an address book according to an embodiment of the present invention. A dialog box is displayed on a page of the address book application software. Operable options "Add a contact: Xiao ming/12312345678" and "Ignore" are displayed for the user to select. The user can directly perform an operation of adding a contact by tapping "Add a contact: Xiao ming/12312345678".

In this embodiment of the present invention, a category of copied text content is extracted and is matched against a category of a keyword, and a matched group is used as a prompt operation. The prompt operation is displayed in a form of a dialog box, to intelligently push a next action that may be performed by a user, so that complexity of user operations is reduced, and accuracy of pasting text information is improved.

Figure 4:
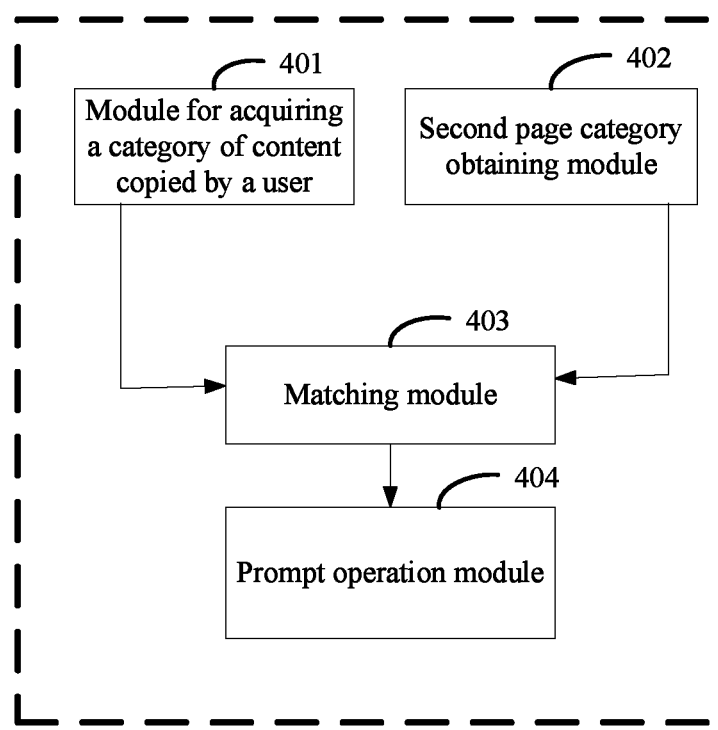
FIG. 4 is a schematic structural diagram of a human-computer interaction apparatus according to an embodiment of the present invention.

The following uses a smart terminal as an example to describe embodiments of the present invention. FIG. 4 is a schematic structural diagram of a human-computer interaction apparatus according to an embodiment of the present invention.

As shown in FIG. 4, the apparatus includes a module 401 for obtaining a category of content copied by a user, a second page category obtaining module 402, a matching module 403, and a prompt operation module 404.

The module 401 for obtaining a category of content copied by a user is configured to: obtain content copied by a user on a first page, and determine a category to which the content belongs.

The second page category obtaining module 402 is configured to obtain a category of a second page.

The matching module 403 is configured to match the category of the content against the category of the second page.

The prompt operation module 404 is configured to: if a matching result is not empty, display at least one operation option on the second page, where the at least one operation option has a function of performing an operation for the content on the second page, and the function is directly performed after the user selects the operation option.

In the apparatus, the module 401 for obtaining a category of content copied by a user is further configured to: perform semantic analysis on the text content copied by the user to obtain a keyword of the copied text content, and match the keyword against a keyword category library to extract a category of the keyword.

In the apparatus, the matching module 403 is further configured to: separately match one or more categories of the keyword against one or more categories of an application software page, to obtain one or more matched combinations of the keyword and the application software page.

In the apparatus, a matched combination of a category of a keyword and a category of an application software page is used as an operable option and is displayed in a form of a dialog box, so that a "paste" operation in this embodiment of the present invention is completed.

In this embodiment of the present invention, a category of copied text content is extracted and is matched against a category of a keyword, and a matched group is used as a prompt operation. The prompt operation is displayed in a form of a dialog box, to intelligently push a next action that may be performed by a user, so that complexity of user operations is reduced, and accuracy of pasting text information is improved.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementations, the objective, technical solutions, and benefits of the present invention are further described in detail. It should be understood that the foregoing descriptions are merely specific implementations of the present invention, but are not intended to limit the protection scope of the present invention. Any modification, equivalent replacement, or improvement made without departing from the spirit and principle of the present invention should fall within the protection scope of the present invention.

What is claimed is:

1. A method of displaying, within an electronic map application on a user device, a text string from another application separate and distinct from the electronic map application, wherein the electronic map application comprises multiple user interface pages enabling a user to interact with the electronic map application, the method comprising:
    detecting that a first user interface page of the multiple user interface pages of the electronic map application is open;
    finding, without the user initiating a text pasting operation, in a repository temporally storing user-copied text, a text string copied from an application that is separate and distinct from the electronic map application, wherein the text string has not been entered by the user in the electronic map application, and wherein the text string indicates a location;
    determining an interval between a time at which the text string is copied from the application and a time at which the first user interface page is opened;
    comparing the interval to a preset threshold;
    determining the interval is valid based on the interval not being greater than the preset threshold; and
    displaying, within the electronic map application and based on the interval being determined to be valid, the text string to enable the user to interact with the electronic map application using the location indicated by the text string.

2. The method of claim 1, wherein the text string is obtained from a storage associated with the user device, the storage underlying a clipboard implemented on the user device.

3. The method of claim 1, further comprising displaying, within the electronic map application and after detecting the first user interface page is open, one or more performable operation options to enable the user to execute the one or more performable operation options, wherein the one or more performable operation options include an performable operation option enabling the user to open a second user interface page of the multiple user interface pages, the second user interface page displaying the location indicated by the text string on a map.

4. The method of claim 1, further comprising displaying, within the electronic map application and after detecting the first user interface page is open, one or more performable operation options to enable the user to execute the one or more performable operation options, wherein the one or more performable operation options include an performable operation option enabling the user to open a second user interface page of the multiple user interface pages, the second user interface page enabling the user to search for one or more items in and/or around the location indicated by the text string.

5. The method of claim 1, wherein finding the text string comprises:
    obtaining the user copied text stored in the repository;
    parsing the user copied text for a location-indicating text string; and
    finding the location-indicating text string as the text string.

6. The method of claim 1, further comprising:
    receiving a user input to a settings menu of the user device to adjust the preset threshold; and
    adjusting the preset threshold in response to the user input to the settings menu.

7. A method of displaying an electronic map app running on a user device without a user initiating one or more performable operation options within the electronic map app, wherein the electronic map app comprises multiple user interface pages enabling the user to interact with the electronic map app, the method comprising:
    detecting that one of the user interface pages of the electronic map app is open;
    detecting text that is stored in a storage within of the user device, wherein the text is copied by the user from an app separate and distinct from the electronic map app and has not been entered by the user in the electronic map app, and wherein the text includes a text string indicating a location;

determining an interval between a time at which the text is copied from the app and a time at which the user interface page is opened;

comparing the interval to a preset threshold;

determining the interval is valid based on the interval not being greater than the preset threshold; and displaying, within the electronic map app and based on the interval being determined to be valid, the one or more performable operation options to enable the user to execute the one or more performable operation options, wherein the one or more performable operation options are associated with the text string.

8. The method of claim 7, wherein the storage facilitates, on the user device, an implementation of a repository for recording text entered by the user on the user device over a time period.

9. The method of claim 7, wherein the one or more performable operation options include a performable operation option enabling the user to view the location indicated by the text string on a map within the electronic map app.

10. The method of claim 7, wherein the one or more performable operation options include a performable operation option enabling the user to search for one or more items in and/or around a location indicated by the text string.

11. The method of claim 7, further comprising displaying, within the user interface page and without user input, the text string next to the one or more performable operation options.

12. The method of claim 7, further comprising:
receiving a user input to a settings menu of the user device to adjust the preset threshold; and
adjusting the preset threshold in response to the user input to the settings menu.

13. A user device configured to display, within an electronic map application on a user device, a text string from another application separate and distinct from the electronic map application, wherein the electronic map application comprises multiple user interface pages enabling a user to interact with the electronic map application, the user device comprising:
a processor; and
a memory coupled to the processor and configured to store instructions that, when executed by the processor, cause the user device to be configured to:
detect that a first user interface page of the multiple user interface pages of the electronic map application is open;
find, without the user initiating a text pasting operation, in a repository temporally storing user-copied text, a text string copied from an application that is separate and distinct from the electronic map application, wherein the text string has not been entered by the user in the electronic map application, and wherein the text string indicates a location;
determine an interval between a time at which the text string is copied from the application and a time at which the first user interface page is opened;
compare the interval with a preset threshold;
determine the interval is valid based on the interval not being greater than the preset threshold; and
display, within the electronic map application and based on the interval being determined to be valid, the text string to enable the user to interact with the electronic map application using the location indicated by the text string.

14. The user device of claim 13, wherein the text string is obtained from a storage associated with the user device, the storage underlying a clipboard implemented on the user device.

15. The user device of claim 13, wherein the instructions, when executed by the processor, further cause the user device to be configured to display, within the first user interface page and after detecting the first user interface page is open, one or more performable operation options to enable the user to execute the one or more performable operation options, wherein the one or more performable operation options include an performable operation option enabling the user to open a second user interface page of the multiple user interface pages, the second user interface page displaying the location indicated by the text string on a map.

16. The user device of claim 13, wherein the instructions, when executed by the processor, further cause the user device to be configured to display, within the first user interface page and after detecting the first user interface page is open, one or more performable operation options to enable the user to execute the one or more performable operation options, wherein the one or more performable operation options include an performable operation option enabling the user to open a second user interface page of the multiple user interface pages, the second user interface page enabling the user to search for one or more items in and/or around the location indicated by the text string.

17. The user device of claim 13, wherein the user device being configured to find the text string comprises the user device being configured to:
obtain the user-copied text stored in the repository;
parse the user-copied text for a location-indicating text string; and
find the location-indicating text string as the text string.

18. The user device of claim 13, wherein the preset threshold is adjustable in a settings menu of the user device.

19. A user device configured to display an electronic map app running on the user device without a user initiating one or more performable operation options within the electronic map app, wherein the electronic map app comprises multiple user interface pages enabling the user to interact with the electronic map app, the user device comprising:
a processor; and
a memory coupled to the processor and configured to store instructions that, when executed by the processor, cause the user device to be configured to:
detect that one of the user interface pages of the electronic map app is open;
detect text that is stored in a storage of the user device, wherein the text is copied by the user from an app separate and distinct from the electronic map app and has not been entered by the user in the electronic map app, and wherein the text includes a text string indicating a location;
determine an interval between a time at which the text is copied from the app and a time at which the user interface page is opened;
compare the interval to a preset threshold;
determine the interval is valid based on the interval not being greater than the preset threshold; and
display, within the electronic map app and based on the interval being determined to be valid, the one or more performable operation options to enable the user to execute the one or more performable operation options, wherein the one or more performable operation options are associated with the text string.

20. The user device of claim 19, wherein the storage facilitates, on the user device, an implementation of a repository for recording text entered by the user on the user device over a time period.

21. The user device of claim 19, wherein the one or more performable operation options include a performable operation option enabling the user to view the location indicated by the text string on a map within the electronic map app.

22. The user device of claim 19, wherein the one or more performable operation options include a performable operation option enabling the user to search for one or more items in and/or around a location indicated by the text string.

23. The user device of claim 19, wherein the instructions, when executed by the processor, further cause the user device to be configured to display, within the user interface page and without the user initiating a pasting operation, the text string next to the one or more performable operation options.

24. The user device of claim 19, wherein the preset threshold is adjustable in a settings menu of the user device.

25. A software product for displaying, within an electronic map application on a user device, a text string from another application separate and distinct from the electronic map application, wherein the electronic map application comprises multiple user interface pages enabling a user to interact with the electronic map application, the software product comprising a set of instructions that, when executed by a processor of the user device, cause the user device to be configured to:
   detect that a first user interface page of the multiple user interface pages of the electronic map application is open;
   find, without the user initiating a text pasting operation, in a repository temporally storing user-copied text, a text string copied from an application that is separate and distinct from the electronic map application, wherein the text string has not been entered by the user in the electronic map application, and wherein the text string indicates a location;
   determine an interval between a time at which the text string is copied from the application and a time at which the first user interface page is opened;
   compare the interval to a preset threshold;
   determine the interval is valid based on the interval not being greater than the preset threshold; and
   display, within the electronic map application and based on the interval being determined to be valid, the text string to enable the user to interact with the electronic map application using the location indicated by the text string.

26. The software product of claim 25, wherein the text string is obtained from a storage associated with the user device, the storage underlying a clipboard implemented on the user device.

27. The software product of claim 25, wherein the instructions, when executed by the processor, further cause the user device to be configured to display, within the electronic map application and after detecting the first user interface page is open, one or more performable operation options to enable the user to execute the one or more performable operation options, wherein the one or more performable operation options include an performable operation option enabling the user to open a second user interface page of the multiple user interface pages, the second user interface page displaying the location indicated by the text string on a map.

28. The software product of claim 25, wherein the instructions, when executed by the processor, further cause the user device to be configured to display, within the electronic map application and after detecting the first user interface page is open, one or more performable operation options to enable the user to execute the one or more performable operation options, wherein the one or more performable operation options include an performable operation option enabling the user to open a second user interface page of the multiple user interface pages, the second user interface page enabling the user to search for one or more items in and/or around the location indicated by the text string.

29. The software product of claim 25, wherein the user device being configured to find the text string comprises the user device being configured to:
   obtain the user-copied text stored in the repository;
   parse the user-copied text for a location-indicating text string; and
   find the location-indicating text string as the text string.

30. The software product of claim 25, wherein the preset threshold is adjustable in a settings menu of the user device.

31. A software product for displaying an electronic map app running on a user device without a user initiating one or more performable operation options within the electronic map app, wherein the electronic map app comprises multiple user interface pages enabling the user to interact with the electronic map app, the software product comprising a set of instructions that, when executed by a processor of the user device, cause the user device to be configured to:
   detect that one of the user interface pages of the electronic map app is open;
   detect text that is stored in a storage of the user device, wherein the text is copied by the user from an app separate and distinct from the electronic map app and has not been entered by the user in the electronic map app, and wherein the text includes a text string indicating a location;
   determine an interval between a time at which the text is copied from the app and a time at which the user interface page is opened;
   compare the interval to a preset threshold;
   determine the interval is valid based on the interval not being greater than the preset threshold; and
   display, within the electronic map app and based on the interval being determined to be valid, the one or more performable operation options to enable the user to execute the one or more performable operation options, wherein the one or more performable operation options are associated with the text string.

32. The software product of claim 31, wherein the storage facilitates, on the user device, an implementation of a repository for recording text entered by the user on the user device over a time period.

33. The software product of claim 31, wherein the one or more performable operation options include a performable operation option enabling the user to view the location indicated by the text string on a map within the electronic map app.

34. The software product of claim 31, wherein the one or more performable operation options include a performable operation option enabling the user to search for one or more items in and/or around a location indicated by the text string.

35. The software product of claim 31, wherein the instructions, when executed by the processor, further cause the user device to be configured to display, within the user interface page and without user input, the text string next to the one or more performable operation options.

36. The software product of claim 31, wherein the preset threshold is adjustable in a settings menu of the user device.

* * * * *

UNITED STATES PATENT AND TRADEMARK OFFICE
CERTIFICATE OF CORRECTION

| | | |
|---|---|---|
| PATENT NO. | : 11,868,710 B2 | |
| APPLICATION NO. | : 17/099680 | |
| DATED | : January 9, 2024 | |
| INVENTOR(S) | : Chundong Li et al. | |

It is certified that error appears in the above-identified patent and that said Letters Patent is hereby corrected as shown below:

In the Claims

Claim 5, Column 14, Line 44: "the user copied text" should read "the user-copied text"

Claim 5, Column 14, Line 45: "the user copied text" should read "the user-copied text"

Claim 7, Column 14, Line 62: "a storage within of the" should read "a storage of the"

Signed and Sealed this
Thirteenth Day of February, 2024

Katherine Kelly Vidal
*Director of the United States Patent and Trademark Office*